(12) United States Patent
Wu et al.

(10) Patent No.: US 11,343,827 B2
(45) Date of Patent: May 24, 2022

(54) RADIO RESOURCE CONFIGURATION METHOD, NETWORK-SIDE DEVICE, AND USER-SIDE DEVICE

(71) Applicant: VIVO MOBILE COMMUNICATION CO., LTD., Chang'an Dongguan (CN)

(72) Inventors: Yumin Wu, Chang'an Dongguan (CN); Xiaodong Sun, Chang'an Dongguan (CN); Xiaodong Shen, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 20 days.

(21) Appl. No.: 16/649,022

(22) PCT Filed: Aug. 27, 2018

(86) PCT No.: PCT/CN2018/102554
§ 371 (c)(1),
(2) Date: Mar. 19, 2020

(87) PCT Pub. No.: WO2019/056928
PCT Pub. Date: Mar. 28, 2019

(65) Prior Publication Data
US 2020/0296727 A1 Sep. 17, 2020

(30) Foreign Application Priority Data
Sep. 25, 2017 (CN) .......................... 201710876208.3

(51) Int. Cl.
*H04W 72/04* (2009.01)
*H04W 76/27* (2018.01)
(Continued)

(52) U.S. Cl.
CPC ....... *H04W 72/0493* (2013.01); *H04L 5/0082* (2013.01); *H04L 5/0098* (2013.01);
(Continued)

(58) Field of Classification Search
CPC ............. H04W 72/0493; H04W 76/27; H04W 72/042; H04W 80/02; H04W 80/08;
(Continued)

(56) References Cited

U.S. PATENT DOCUMENTS 7,894,444 B2 * 2/2011 Lohr ...................... H04L 47/14
370/394
10,148,337 B2 * 12/2018 Ng ..................... H04W 72/0453
(Continued)

FOREIGN PATENT DOCUMENTS

| CN | 103428876 A | 12/2013 |
| EP | 2779745 A1 | 9/2014 |

(Continued)

OTHER PUBLICATIONS

Extended European Search Report for related Application No. 18857827.2; dated Mar. 4, 2021.
(Continued)

*Primary Examiner* — Afshawn M Towfighi
(74) *Attorney, Agent, or Firm* — von Briesen & Roper, s.c.

(57) ABSTRACT

The embodiments of the present application discloses a radio resource configuration method, a network-side device and a user-side device. The method includes: receiving configuration information for indicating to perform activation or deactivation of a radio resource configuration; wherein the radio resource configuration includes a CORESET configuration and/or a quasi co-location (QCL) related configuration; activating or deactivating the radio resource configuration according to the configuration information. In the application, the activation or deactivation of the radio resource configuration is achieved; moreover, the rapid activation or deactivation of the radio resource configuration is achieved; it is ensured that the times known by the
(Continued)

network-side device and the user-side device, at which the activation or deactivation operation on the user-side device is consistent; and the utilization efficiency of air interface resources is improved.

18 Claims, 3 Drawing Sheets

(51) Int. Cl.
- *H04L 5/00* (2006.01)
- *H04W 80/02* (2009.01)
- *H04W 80/08* (2009.01)

(52) U.S. Cl.
CPC ......... *H04W 72/042* (2013.01); *H04W 76/27* (2018.02); *H04W 80/02* (2013.01); *H04W 80/08* (2013.01)

(58) Field of Classification Search
CPC .... H04W 72/04; H04W 76/20; H04L 5/0082; H04L 5/0098; H04L 5/0094; H04L 5/0023; H04L 5/0053; H04L 5/0048; H04L 5/0057; H04B 7/0695
See application file for complete search history.

(56) References Cited

U.S. PATENT DOCUMENTS

| | | | | |
|---|---|---|---|---|
| 10,972,158 | B2* | 4/2021 | Hu | H04W 74/0833 |
| 2009/0312023 | A1* | 12/2009 | Kazmi | H04W 36/0088 |
| | | | | 455/436 |
| 2013/0336299 | A1* | 12/2013 | Lee | H04L 5/0057 |
| | | | | 370/336 |
| 2014/0228032 | A1 | 8/2014 | Jung et al. | |
| 2016/0374119 | A1* | 12/2016 | Choi | H04W 16/32 |
| 2019/0075589 | A1* | 3/2019 | Jeon | H04W 72/1278 |
| 2020/0205150 | A1* | 6/2020 | Cheng | H04B 7/0691 |

FOREIGN PATENT DOCUMENTS

| | | |
|---|---|---|
| WO | WO 2013/020517 A1 | 2/2013 |
| WO | WO 2018/143702 A1 | 8/2018 |

OTHER PUBLICATIONS

Samsung, "Support of QCL indication for aperiodic and multi-shot CSI-RS", Nov. 14-18, 2016, 3GPP TSG RAN WG1 #87, Reno, USA.

Ericsson, "On DL beam indication", Jun. 27-30, 2017, 3GPP TSG-RAN WG1 #89ah-NR, Qingdao, China.
Sanechips ZTE, "Details and evaluation results on beam indication", Sep. 18-21, 2017, 3GPP TSG RAN WG1 Meeting NR#3, Nagoya, Japan.
Samsung, "Remaining details on QCL", Sep. 18-21, 2017, 3GPP TSG RAN WG1 Meeting NR#3, Nagoya, Japan.
Ericsson, "On beam indication, measurement, and reporting", Sep. 18-21, 2017, 3GPP TSG-RAN WG1 NR Ad Hoc #3, Nagoya, Japan.
Nokia Shanghai Bell Nokia, "Summary of QCL", Sep. 18-21, 2017, 3GPP TSG RAN WG1 Meeting NR#3, Nagoya, Japan.
Qualcomm, "Summary on Beam Management Offline", Sep. 18-21, 2017, 3GPP TSG RAN WG1 Meeting #90AH, Nagoya, Japan.
Extended European Search Report for related Application No. 18857827.2; dated Nov. 2, 2020.
Guangdong Oppo Mobile Telecom, "Remaining issues on bandwidth part configuration and activation", Sep. 18-21, 2017, 3GPP TSG RAN WG1 Meeting NR #3, Nagoya, Japan.
International Search Report & Written Opinion related to Application No. PCT/CN2018/102554; dated Nov. 19, 2018.
Samsung; "On Beam Indication"; 3GPP TSG RAN WG1 NR AH#3; R1-1715964; Nagoya, Japan; Sep. 18, 2017-Sep. 21, 2017.
Qualcomm Incorporated; "UE power saving for PDCCH monitoring"; 3GPP TSG-RAN WG1 NR AdHoc; R1-1700817; Jan. 16, 2017-Jan. 20, 2017; Spokane, U.S.A.
Qualcomm; "Potential agreements on beam management"; RAN1 #89; R1-1709774; May 15-May 19; Hangzhou, China.
European Search Report Application No. 18836029.1; dated Jun. 24, 2020.
Ericsson; "Measurement framework enhancement for mobility for aerial UEs while airborne"; 3GPP TSG-RAN WG2 #101 bis; Tdoc R2-1805610; Sanya, China Apr. 16, 2018-Apr. 20, 2018.
Samsung, "Discussion on Adaption of Measurement Related Parameters for Different Mobility Scenarios"; 3GPP TSG RAN WG2 NR AH #2; R2-1707325; Qingdao, China, Jun. 27, 2017-Jun. 29, 2017.
Ericsson; "UE speed based measurement report parameter scaling in NR"; 3GPP TSG-RAN WG2 #98-AdHoc; Tdoc R2-1707288; Qingdao, China, Jun. 27, 2017-Jun. 29, 2017.
"3$^{rd}$ Generation Partnership Project; Technical Specification Group Radio Access Network; Evolved Universal Terrestrial Radio Access (E-UTRA); Radio Resource Control (RRC); Protocol specification (Release 14)", 3GPP Standard; Technical Specification; 3GPP TS 36.331, 3$^{rd}$ Generation Partnership Project (3GPP), Mobile Competence Centre; 650, Route Des Lucioles; F-06921 Sophia-Antipolis Cedex; France, vol. RAN WG2, No. V14.3.0, Jul. 13, 2017, pp. 1-745, XP051336663.

* cited by examiner

RADIO RESOURCE CONFIGURATION METHOD, NETWORK-SIDE DEVICE, AND USER-SIDE DEVICE

CROSS-REFERENCE TO RELATED APPLICATION

This patent application is a 35 USC § 371 U.S. national stage of International Application No. PCT/CN2018/102554 filed on Aug. 27, 2018, which claims priority to Chinese Patent Application No. 201710876208.3 filed on Sep. 25, 2017, the disclosures of which are incorporated in their entirety by reference herein.

TECHNICAL FIELD

The present application relates to the field of communication technology, and in particular to a radio resource configuration method, a network-side device, and a user-side device.

BACKGROUND

In the future $5^{th}$ generation (5G) mobile communication system, in order to achieve the goals of 20 Gbps downlink transmission rate and 10 Gbps uplink transmission rate, high-frequency communication technology and large-scale antenna technology will be introduced. High-frequency communication can provide a wider bandwidth system, and the antenna size can be smaller, which facilitates the deployment of large-scale antennas in a base station and a user equipments (UE). The multi-beam transmission and receiving on the base station and the multi-beam transmission and receiving on the UE are widely used. Therefore, data transmission between the base station and user equipment is generally achieved by the multi-beam transmissions of the base station and the UE.

During the data transmission, for different working beams on the UE side, it is necessary to activate or deactivate the configuration of unused radio resource. However, in the prior art, although activation or deactivation of the radio resource configuration can be achieved, it takes a long time.

SUMMARY

An object of the embodiments of the present application is to provide a radio resource configuration method, a network-side device and a user-side device in order to implement rapid activation or deactivation of radio resource configuration.

To solve the above technical problems, the embodiments of the present application are implemented as follows:

In a first aspect, an embodiment of the present disclosure provides a radio resource configuration method which includes:

receiving configuration information for indicating to perform activation or deactivation of a radio resource configuration; wherein the radio resource configuration includes a CORESET configuration and/or a quasi co-location (QCL) related configuration;

activating or deactivating the radio resource configuration according to the configuration information.

In a second aspect, an embodiment of the present disclosure further provides a radio resource configuration method which includes:

sending configuration information for indicating to perform activation or deactivation of a radio resource configuration; wherein the radio resource configuration includes a CORESET configuration and/or a quasi co-location (QCL) related configuration.

In a third aspect, an embodiment of the present disclosure further provides a user-side device which includes:

a receiving module configured to receive configuration information for indicating to perform activation or deactivation of a radio resource configuration; wherein the radio resource configuration includes a CORESET configuration and/or a quasi co-location (QCL) related configuration;

an execution module configured to activate or deactivate the radio resource configuration according to the configuration information.

In a fourth aspect, an embodiment of the present disclosure further provides a network-side device which includes:

a sending module configured to send configuration information for indicating to perform activation or deactivation of a radio resource configuration; wherein the radio resource configuration includes a CORESET configuration and/or a quasi co-location (QCL) related configuration.

In a fifth aspect, an embodiment of the present disclosure further provides a user-side device which includes:

a storage, a processor, and a radio resource configuration program stored on the storage and capable of running on the processor, the radio resource configuration program implements, when executed by the processor, the steps of the radio resource configuration method according to the above second aspect.

In a sixth aspect, an embodiment of the present disclosure further provides a network-side device which includes:

a storage, a processor, and a radio resource configuration program stored on the storage and capable of running on the processor, the radio resource configuration program implements, when executed by the processor, the steps of the radio resource configuration method according to the above first aspect.

In a seventh aspect, an embodiment of the present disclosure further provides a computer readable storage medium storing a radio resource configuration program thereon, the radio resource configuration program implements, when executed by a processor, the steps of the radio resource configuration method according to the above first aspect; or, the radio resource configuration program implements, when executed by the processor, the steps of the radio resource configuration method according to the above second aspect.

It can be seen from the above technical solutions provided by the embodiments of the present application that the solutions of the embodiments of the present application have at least one of the following technical effects: the rapid activation or deactivation of the radio resource configuration is achieved; it is ensured that the times known by the network-side device and the user-side device, at which the activation or deactivation operation on the user-side device is performed, are consistent; and the utilization efficiency of air interface resources is improved.

BRIEF DESCRIPTION OF THE DRAWINGS

In order to explain the technical solutions in the embodiments of the present application or the prior art more clearly, the drawings used in the description of the embodiments or the prior art will be briefly introduced below. Obviously, the drawings in the following description are merely some of the embodiments recited in this application. For those of ordinary skill in the art, other drawings can be obtained based on these drawings without paying creative labor.

DETAILED DESCRIPTION

The technical solutions in the embodiments of the present application will be clearly and completely described below with reference to the drawings in the embodiments of the present application. Obviously, the described embodiments are some of the embodiments of the present application, but not all of the embodiments. Based on the embodiments in the present application, all other embodiments obtained by a person of ordinary skill in the art without creative efforts shall fall within the protection scope of the present application.

The technical solutions of the present application may be applied to various communication systems, such as the Global System of Mobile Communication (GSM), the Code Division Multiple Access (CDMA) system, the Wideband Code Division Multiple Access Wireless (WCDMA) system, the General Packet Radio Service (GPRS), the Long Term Evolution (LTE), and so on.

A User Equipment (UE) can also be referred to as a mobile terminal, an access terminal, a user unit, a user station, a mobile station, a mobile platform, a remote station, a remote terminal, a mobile device, a user terminal, a terminal, a wireless communication device, a user agent, or a user device. The access terminal can be a cellular phone, a cordless phone, a Session Initiation Protocol (SIP) phone, a Wireless Local Loop (WLL) station, a Personal Digital Assistant (PDA), a handheld device and a computing device with a wireless communication function or other processing device connected to a wireless modem, an in-vehicle device, a wearable device, a terminal device in the future 5G network, or a terminal equipment in the future Public Land Mobile Network (PLMN) network.

A network device may be a device for communicating with a mobile device, and the network device may be a Base Transceiver Station (BTS) in the Global System of Mobile Communication (GSM) or Code Division Multiple Access (CDMA), or a NodeB (NB) in the Wideband Code Division Multiple Access (WCDMA), or an eNB or an Evolution Node B (eNodeB) or an access point in the Long Term Evolution (LTE), or an in-vehicle device, a wearable device, a network-side device in the future 5G network, or a network device in the future evolved Public Land Mobile Network (PLMN).

The system to which the present application is applicable may be a system in which Frequency Division Duplex (FDD), Time Division Duplex (TDD), or the two duplex modes of FDD and TDD is/are used, which is not limited in the present application.

Figure 1:
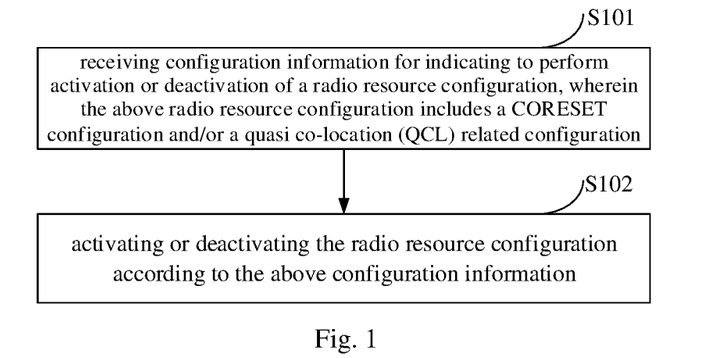
FIG. 1 is a method flowchart of a radio resource configuration method in an embodiment of the present application.

FIG. 1 is a method flowchart of a radio resource configuration method in an embodiment of the present application. The method is performed by a user-side device. The method shown in FIG. 1 may include:

Step S101, receiving configuration information for indicating to perform activation or deactivation of a radio resource configuration; wherein the above radio resource configuration includes a CORESET configuration and/or a quasi co-location (QCL) related configuration.

Step S102, activating or deactivating the radio resource configuration according to the above configuration information.

In the embodiment of the present application, as for the above radio resource configuration, there are at least three situations a, b, c as follows:

a, the radio resource configuration includes a CORESET related configuration;

b, the radio resource configuration includes a QCL related configuration; and c, the radio resource configuration includes both the CORESET related configuration and the QCL related configuration.

In the embodiment of the present application, the CORESET configuration is a configuration related to a signal parameter in a downlink control channel; the signal parameter includes at least one of: time, frequency, signal coding or signal space for signal receiving.

The CORESET configuration includes at least one of: a frequency point of a control channel, a bandwidth of a frequency band of the control channel, a type of subcarrier spacing of the frequency band, a coding mode of the control channel, a beam identification, or a reference signal configuration.

The QCL configuration may include various types of signals, such as the Channel State Information-Reference Signaling (CSI-RS), the Synchronous Signal Block (SS block), and so on. The network-side device is provided with QCL signals corresponding to different beams. Thus, in the embodiment of the present application, the working beam on the user-side device may be changed by activating or deactivating the QCL.

In a specific implementation, when it is necessary to activate or deactivate the radio resource configuration, the network-side device sends the configuration information to the user-side device, and the user-side device performs an activation or deactivation operation according to the configuration information when it receives the configuration information.

Multiple configurations of radio resource may be stored on the user-side device. Any one of the configurations of radio resource can be selected to be activated or deactivated as required. In order to make the user-side device know which radio resource configuration is to be activated or deactivated, the above configuration information includes an identification of the radio resource configuration which is used to indicate the radio resource configuration to be activated or deactivated. In addition, in order to make the user-side device know whether an activation operation or a deactivation operation is to be performed, in the embodiment of the present disclosure, the above configuration information includes a bit indicating activation or deactivation which is used to indicate an activation operation or a deactivation operation. In this way, after the user-side device receives the configuration information sent by the network-side device, it performs activating or deactivating the radio resource configuration according to the configuration information, which specifically includes:

performing activation of the radio resource configuration corresponding to the above identification according to the bit indicating activation carried in the configuration information; or, performing deactivation of the radio resource configuration corresponding to the above identification according to the bit indicating deactivation.

In a specific implementation, the bit may indicate activation when it is set as "1", while the bit may indicate deactivation when it is set as "0". In this way, the user-side device can determine whether an activation operation or a deactivation operation will be performed based on whether the bit in the configuration information is 0 or 1.

The above identification may be a number, a name, or the like, corresponding to the radio resource configuration.

In a specific implementation, after the user-side device receives the configuration information sent by the network-side device, it searches for the radio resource configuration corresponding to the identification on the user-side device according to the identification of the radio resource configuration carried in the configuration information; and determines whether the activation operation or the deactivation operation will be performed on the radio resource configuration corresponding to the above identification according to the bit carried in the configuration information, and then performs the corresponding operation on the radio resource configuration corresponding to the identification.

In some specific application scenarios, after the user-side device receives the configuration information, it does not need to perform the activation operation or the deactivation operation immediately; instead, it may need to perform the activation operation or the deactivation operation after a period of time. Thus, in the embodiment of the present application, the above configuration information includes a third time interval and/or a fourth time interval;

the above step S102 of activating or deactivating the above radio resource configuration according to the configuration information includes:

performing an operation of activating the corresponding radio resource configuration after the third time interval from reception of the configuration information; and/or performing an operation of deactivating the corresponding radio resource configuration after the fourth time interval from reception of the configuration information.

In the embodiment of the present application, the above configuration information includes the third time interval; or, the above configuration information includes the fourth time interval; or, the above configuration information includes both the first and the fourth time intervals.

Specifically, the user-side device may start timing after receiving the configuration information sent by the network-side device; when the duration of the timing reaches the third time interval, the operation of activating the corresponding configuration of wireless resource is performed.

Wherein, the above third time interval and fourth time interval are both predetermined.

In a specific implementation, the above configuration information includes the first and fourth time intervals which may be for different configurations of radio resource, for example, a radio resource configuration A and a radio resource configuration B. After the third time interval from reception of the configuration information carrying the first and fourth time intervals, the operation of activating the radio resource configuration A may be performed; and after the fourth time interval from reception of the above configuration information, the operation of deactivating the radio resource configuration B may be performed.

In some specific application scenarios, the user-side device needs to perform the activation operation on the radio resource configuration after a period of time from deactivating the radio resource configuration by the user-side device; in this case, the network-side device needs to send configuration information or to send an instruction to the user-side device again, to enable the user-side device to perform the corresponding instruction; or, the user-side device needs to perform the deactivation operation on the radio resource configuration after a period of time from activating the radio resource configuration by the user-side device; in this case, the network-side device needs to send configuration information or to send an instruction to the user-side device again, to enable the user-side device to perform the corresponding instruction. In order to reduce the information interaction between the network-side device and the user-side device, in the embodiment of the present application, the above configuration information includes a first timer and/or a second timer.

In the above step S102, the activating or deactivating the radio resource configuration according to the configuration information includes:

initiating the above first timer after deactivating a corresponding radio resource configuration or receiving the configuration information for indicating to perform deactivation of the corresponding radio resource configuration; activating the above radio resource configuration when the first timer expires;

and/or, initiating the above second timer after activating the corresponding radio resource configuration or receiving the configuration information for indicating to perform activation of the corresponding radio resource configuration; deactivating the above radio resource configuration when the second timer expires.

The above configuration information includes the first timer; or, the above configuration information includes the second timer; or, the above configuration information includes both the first and second timers.

In the case that the above configuration information includes the first timer, the specific procedure is: an identification of the radio resource configuration is carried in the above configuration information; after receiving the configuration information sent by the network-side device, the user-side device deactivates the radio resource configuration corresponding to the identification, and initiates the first timer after deactivating the radio resource configuration corresponding to the identification; the first timer starts timing, and when the first timer expires, the above radio resource configuration is activated; or, the above first timer is initiated after the user-side device receives the configuration information indicating to perform deactivation of the corresponding radio resource configuration, and at this time, the first timer starts timing; when the first timer expires, the user-side device is triggered to perform the activation of the above radio resource configuration.

In a specific implementation, the configuration information sent by the network-side device to the user-side device includes therein the first and second timers. The first and second timers may be for two different configurations of radio resource, for example, for a radio resource configuration A and a radio resource configuration B. When the user-side device receives the configuration information carrying the first and second timers, it deactivates the radio resource configuration A, and then initiates the first timer; at this time, the first timer starts timing, and when the first timer expires, the radio resource configuration A is activated; moreover, after receiving the above configuration information, the user-side device also activates the radio resource configuration B, and initiates the second timer after activating the radio resource configuration B; at this time, the second timer starts timing, and when the second timer expires, the operation of deactivating the radio resource configuration B is performed.

In addition to the above-mentioned cases, the time at which the user-side device performs the activation operation or the deactivation operation may be determined by a protocol, as described below.

In the above step S102, the activating or deactivating the radio resource configuration according to the above configuration information includes:

performing the operation of activating the corresponding radio resource configuration after a predetermined first time interval from reception of the configuration information; or performing the operation of deactivating the corresponding radio resource configuration after a predetermined second time interval from reception of the configuration information.

In step S102, the activating or deactivating the radio resource configuration according to the configuration information includes:

initiating a predetermined third timer after deactivating the corresponding radio resource configuration or receiving the configuration information for indicating to perform deactivation of the corresponding radio resource configuration; activating the corresponding radio resource configuration when the third timer expires; or initiating a predetermined fourth timer after activating the corresponding radio resource configuration or receiving the configuration information for indicating to perform activation of the corresponding radio resource configuration; deactivating the corresponding radio resource configuration when the fourth timer expires.

In the embodiment of the present disclosure, the above configuration information may be received through at least one of the following protocols:

a physical layer protocol, a media access control layer protocol, a radio link control layer protocol, a packet data convergence protocol, a service data adaptation protocol, and a radio resource control protocol.

In a specific implementation, in order to facilitate the network-side device to accurately know the time at which the user-side device performs the activation or deactivation operation, in the embodiment of the present disclosure, after the user-side device receives the configuration information sent by the network-side device, the user-side device records the time information about the time at which the configuration information is received, and returns the time information to the network-side device, so that the network-side device can determine the time at which the user-side device performs the activation or deactivation operation according to the time information and the time specified in the configuration information to perform the activation or deactivation, thereby ensuring that the times known by the network-side device and the user-side device, at which the activation or deactivation operation on the user-side device is performed, are consistent.

In the prior art, a user-side device is configured by issuing a Radio Resource Control (RRC) message, and the RRC message usually takes a long processing time, resulting in a long configuration time. The embodiment of the present application changes the configuration of a user-side device by sending the configuration information for indicating to perform activation or deactivation of the radio resource configuration. Compared with the prior art, the configuration of the user side can be activated or deactivated rapidly. Furthermore, the configuration information for indicating to perform activation or deactivation of the radio resource configuration can be sent through a MAC (a physical address) or PDCCH (Physical Downlink Control Channel) control signaling that take a shorter processing time, to activate or deactivate the relevant configuration, thereby achieving a rapid change of the configuration of the user-side device.

In the embodiment of the present application, the network-side device sends the configuration information to the user-side device so that the user-side device performs an operation of activating or deactivating the radio resource configuration according to the configuration information, thereby achieving a rapid activation or deactivation of the radio resource configuration. Moreover, after receiving the configuration information, the user-side device returns to the network-side device the time at which it receives the configuration information so that the network-side device can determine the time at which the user-side device performs the activation or deactivation operation, which ensures that the times known by the network-side device and the user-side device, at which the activation or deactivation operation on the user-side device is performed, are consistent, and thus the utilization efficiency of air interface resources is improved.

Therefore, the beneficial effects of the embodiment of the present application include at least: achieving the rapid activation or deactivation of the radio resource configuration; ensuring that the times known by the network-side device and the user-side device, at which the activation or deactivation operation on the user-side device is performed, are consistent; and improving the utilization efficiency of air interface resources.

Figure 2:
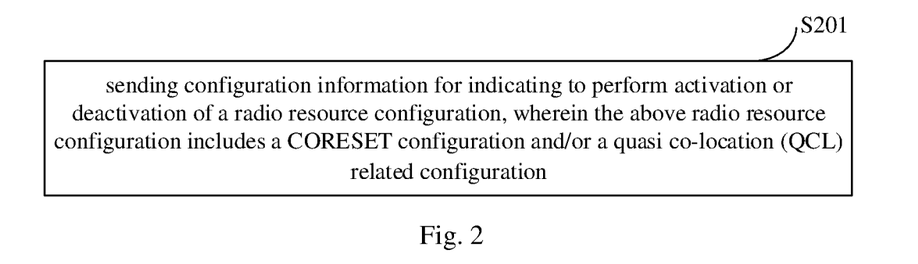
FIG. 2 is a method flowchart of a radio resource configuration method in another embodiment of the present application.

FIG. 2 is a method flowchart of a radio resource configuration method in another embodiment of the present application. The method is performed by a network-side device. The method in FIG. 2 may include:

Step S201, sending configuration information for indicating to perform activation or deactivation of a radio resource configuration, wherein the radio resource configuration includes a CORESET configuration and/or a quasi co-location (QCL) related configuration.

In the embodiment of the present application, as for the above radio resource configuration, there are at least three situations a, b, c as follows:

a, the radio resource configuration includes a CORESET related configuration;

b, the radio resource configuration includes a QCL related configuration; and c, the radio resource configuration includes both the CORESET related configuration and the QCL related configuration.

In the embodiment of the present application, the CORESET configuration is a configuration related to a signal parameter in a downlink control channel; the signal parameter includes at least one of: time, frequency, signal coding or signal space for signal receiving.

The CORESET configuration includes at least one of: a frequency point of a control channel, a bandwidth of a frequency band of the control channel, a type of subcarrier spacing of the frequency band, a coding mode of the control channel, a beam identification, or a reference signal configuration.

The QCL configuration may include various types of signals, such as the CSI-RS, the SS block, and so on. The network-side device is provided with QCL signals corresponding to different beams. Thus, in the embodiment of the present application, the working beam on the user-side device may be changed by activating or deactivating the QCL.

In a specific implementation, when it is necessary to activate or deactivate the radio resource configuration, the network-side device sends the configuration information to the user-side device, and the user-side device performs an activation or deactivation operation according to the configuration information when it receives the configuration information.

Multiple configurations of radio resource are stored on the user-side device. Any one of the configurations of radio resource can be selected to be activated or deactivated as required. In order to make the user-side device know which radio resource configuration is to be activated or deactivated, the above configuration information includes an identification of the radio resource configuration which is used to indicate the radio resource configuration to be activated or deactivated. In addition, in order to make the user-side device know whether an activation operation or a deactivation operation is to be performed, in the embodiment of the present disclosure, the above configuration information includes a bit indicating activation or deactivation which is used to indicate an activation operation or a deactivation operation. In this way, after the user-side device receives the configuration information sent by the network-side device, it performs a corresponding operation on the corresponding radio resource configuration according to the identification and the bite carried in the configuration information.

The above identification may be a number, a name, or the like, corresponding to the radio resource configuration.

In a specific implementation, the bit may indicate activation when it is set as "1", while the bit may indicate deactivation when it is set as "0". In this way, after the user-side device receives the configuration information, it will perform an activation operation on the corresponding radio resource configuration if it determines that the bit in the above configuration information is 1; on the other hand, it will perform a deactivation operation on the corresponding radio resource configuration if it determines that the bit in the above configuration information is 0.

In some specific application scenarios, after the network-side device sends to the user-side device the configuration information, the user-side device does not need to perform the activation operation or the deactivation operation immediately;

thus, the above configuration information further includes a third time interval and/or a fourth time interval;

the above third time interval is used to indicate performing, after the third time interval from reception of the configuration information, an operation of activating the corresponding radio resource configuration;

the above fourth time interval is used to indicate performing, after the fourth time interval from reception of the configuration information, an operation of deactivating the corresponding radio resource configuration.

Specifically, the above configuration information may include the third time interval; or the above configuration information may include the fourth time interval; or, the above configuration information may include both the first and fourth time intervals.

The following will take the above configuration information including the third time interval as an example to describe the specific process of the radio resource configuration method in this case in detail:

When an activation or deactivation operation is required, the network-side device sends the configuration information carrying the third time interval to the user-side device; meanwhile, the configuration information also carries therein an identification indicating activation or deactivation; after the user-side device receives the configuration information, it finds the corresponding radio resource configuration according to the identification at first, and starts performing the operation of activating the corresponding radio resource configuration after the third time interval elapses.

Wherein, the third time interval is set in advance. For example, in a specific implementation, the third time interval may be set to t, assuming that the current time when the user-side device receives the configuration information is n, then, after the time t has elapsed, that is, at the time n+t, the operation of activating the corresponding radio resource configuration is performed. The specific value of t can be set according to the practical application scenario.

In the embodiment of the present disclosure, in the case that the above configuration information includes the first and fourth time intervals, the first and fourth time intervals may be for different configurations of radio resource. In this case, the operation is performed on the two different configurations of radio resource, for example, for two configurations of radio resource A and B. The operation of activating the radio resource configuration A may be performed after the third time interval from reception of the configuration information carrying the first and fourth time intervals; and the operation of deactivating the radio resource configuration B is performed after the fourth time interval from reception of the above configuration information.

In some embodiments, the user-side device needs to perform a deactivation operation on the radio resource configuration after a period of time from the activation of the radio resource configuration; or, the user-side device needs to perform an activation operation on the radio resource configuration after a period of time from the deactivation of the radio resource configuration; in this case, the network-side device needs to send configuration information or to send an instruction to the user-side device again, to enable the user-side device to perform the corresponding instruction. In order to reduce the information interaction between the network-side device and the user-side device, in the embodiment of the present application, the above configuration information further includes a first timer and/or a second timer;

the above first timer is used to indicate initiating the first timer after deactivating the corresponding radio resource configuration or receiving the configuration information for indicating to perform deactivation of the corresponding radio resource configuration, so as to activate the radio resource configuration when the first timer expires;

the above second timer is used to indicate initiating the second timer after activating the corresponding radio resource configuration or receiving the configuration information for indicating to perform activation of the corresponding radio resource configuration, so as to deactivate the radio resource configuration when the second timer expires.

Specifically, the above configuration information includes the first timer; or, the above configuration information includes the second timer; or, the above configuration information includes both the first and second timers.

In a specific implementation, the configuration information sent by the network-side device to the user-side device carries the first timer therein. In addition, the configuration information also carries therein an identification of the radio resource configuration. After the user-side device receives the configuration information sent by the network-side device, it performs the operation of activating the corresponding radio resource configuration according to the above configuration information, and automatically initiates the above first timer after the user-side device performs the activation of the radio resource configuration. At this time, the first timer starts timing. When the first timer expires, the user-side device is triggered to perform the deactivation of the above radio resource configuration; or, the user-side device may automatically initiate the above first timer after the user-side device receives the configuration information for indicating to perform deactivating the corresponding radio resource configuration sent by the network-side device; at this time, the first timer starts timing, and when the first timer expires, the user-side device is triggered to perform the deactivation of the above radio resource configuration.

In a specific implementation, the configuration information sent to the network-side device by the user-side device includes therein both the first timer and the second timer. The first and second timers may be for two different configurations of radio resource, for example, for a radio resource configuration A and a radio resource configuration B. After receiving the configuration information carrying the first and second timers, the user-side device initiates the first timer after it deactivates the radio resource configuration A; at this time, the first timer starts timing, and when the first timer expires, the radio resource configuration A is activated; moreover, when the user-side device receives the above configuration information, it may also activate the radio resource configuration B, and initiates the second timer after activating the radio resource configuration B; at this time, the second timer starts timing, and when the second timer expires, the operation of deactivating the radio resource configuration B is performed.

In addition to the several situations as mentioned above, the time at which the user-side device performs activation or deactivation may be predetermined by a protocol, as specifically described below.

The above configuration information is used to perform an operation of activating a corresponding radio resource configuration after a predetermined first time interval from reception of the configuration information; and/or to perform an operation of deactivating the corresponding radio resource configuration after a predetermined second time interval from reception of the configuration information.

Specifically, the above configuration information is used to indicate performing the operation of activating a corresponding radio resource configuration after the predetermined first time interval from reception of the configuration information; or the above configuration information is used to indicate performing the operation of deactivating a corresponding radio resource configuration after the predetermined second time interval from reception of the configuration information; or, the above configuration information is used to indicate performing the operation of activating a corresponding radio resource configuration after the predetermined first time interval from reception of the configuration information, and is used to indicate performing the operation of deactivating a corresponding radio resource configuration after the predetermined second time interval from reception of the configuration information.

In a specific implementation, the above configuration information includes a first indication information and a second indication information. The first indication information is used to indicate performing the operation of activating a corresponding radio resource configuration after the predetermined first time interval from reception of the configuration information, and the above second indication information is used to indicate performing the operation of deactivating a corresponding radio resource configuration after the predetermined second time interval from reception of the configuration information. The first indication information and the second indication information may correspond to different configurations of radio resource. For example, the first indication information corresponds to a radio resource configuration A, and the second indication information corresponds to a radio resource configuration B. Thus, when the user-side device receives configuration information carrying the first and second indication information sent from the network-side device, it performs an operation of activating the radio resource configuration A after the predetermined third timer interval elapses; and when receiving the above configuration information, it performs an operation of deactivating the radio resource configuration B after the predetermined second time interval elapses.

In the embodiment of the present application, the above configuration information is further used to indicate initiating a predetermined third timer after deactivating a corresponding radio resource configuration or receiving the configuration information for indicating to perform deactivation of the corresponding radio resource configuration, so as to activate the corresponding radio resource configuration when the third timer expires; and/or to indicate initiating a predetermined fourth timer after activating the corresponding radio resource configuration or receiving the configuration information for indicating to perform activation of the corresponding radio resource configuration, so as to deactivate the corresponding radio resource configuration when the fourth timer expires.

Specifically, the above configuration information is used to indicate initiating the predetermined third timer after deactivating a corresponding radio resource configuration or receiving the configuration information for indicating to perform deactivation of the corresponding radio resource configuration, so as to activate the corresponding radio resource configuration when the third timer expires; or the above configuration information is used to indicate initiating the predetermined fourth timer after activating the corresponding radio resource configuration or receiving the configuration information for indicating to perform activation of the corresponding radio resource configuration, so as to deactivate the corresponding radio resource configuration when the fourth timer expires; or, the above configuration information is used to indicate initiating the predetermined third timer after deactivating a corresponding radio resource configuration or receiving the configuration information for indicating to perform deactivation of the corresponding radio resource configuration, so as to activate the corresponding radio resource configuration when the third timer expires, and is used to indicate initiating the predetermined fourth timer after activating the corresponding radio resource configuration or receiving the configuration information for indicating to perform activation of the corresponding radio resource configuration, so as to deactivate the corresponding radio resource configuration when the fourth timer expires.

In a specific implementation, the network-side device sends configuration information carrying third indication information to the user-side device. The third indication information is used to indicate initiating the predetermined third timer after deactivating a corresponding radio resource configuration or receiving the configuration information for indicating to perform deactivation of the corresponding radio resource configuration, so as to activate the corresponding radio resource configuration when the third timer expires. When the user-side device receives the configuration information, it deactivates the corresponding radio resource configuration; thereafter, the user-side device initiates the predetermined third timer, and the third timer starts timing; when the third timer expires, the user-side device activates the corresponding radio resource configuration;

or, when the user-side device receives the configuration information indicating to perform deactivation of a corresponding radio resource configuration sent from the network-side device, it initiates the predetermined third timer, and the third timer starts timing; when the third timer expires, the user-side device activates the corresponding radio resource configuration.

In a specific implementation, in the case that the above configuration information includes third indication information and fourth indication information, the fourth indication information is used to indicate initiating the predetermined fourth timer after activating the corresponding radio resource configuration or receiving the configuration information for indicating to perform activation of the corresponding radio resource configuration, so as to deactivate the corresponding radio resource configuration when the fourth timer expires.

The third indication information and the fourth indication information correspond to different configurations of radio resource. For example, the third indication information corresponds to a radio resource configuration A, and the fourth indication information corresponds to a radio resource configuration B. When the user-side device receives configuration information carrying the third indication information and the fourth indication information, it deactivates the radio resource configuration A; thereafter, it initiates the predetermined third timer, and activates the radio resource configuration A when the third timer expires; meanwhile, when receiving the above indication information, the user-side device initiates the radio resource configuration B; thereafter, it initiates the predetermined fourth timer, and deactivates the radio resource configuration B when the fourth timer expires.

The above third timer and fourth timer may be either stored on the user-side device, or carried in the configuration information so that it may sent to the user-side device by the network-side device.

In the embodiment of the present disclosure, the configuration information may be sent through at least one of the following protocols:

a physical layer protocol, a media access control layer protocol, a radio link control layer protocol, a packet data convergence protocol, a service data adaptation protocol, and a radio resource control protocol.

In a specific implementation, in order to facilitate the network-side device to accurately know the time at which the user-side device performs the activation or deactivation operation, in the embodiment of the present disclosure, after the user-side device receives the configuration information sent by the network-side device, the user-side device records the time information about the time at which the configuration information is received, and returns the time information to the network-side device, so that the network-side device can determine the time at which the user-side device performs the activation or deactivation operation according to the time information and the time specified in the configuration information to perform the activation or deactivation, thereby ensuring that the times known by the network-side device and the user-side device, at which the activation or deactivation operation on the user-side device is performed, are consistent.

Figure 3:
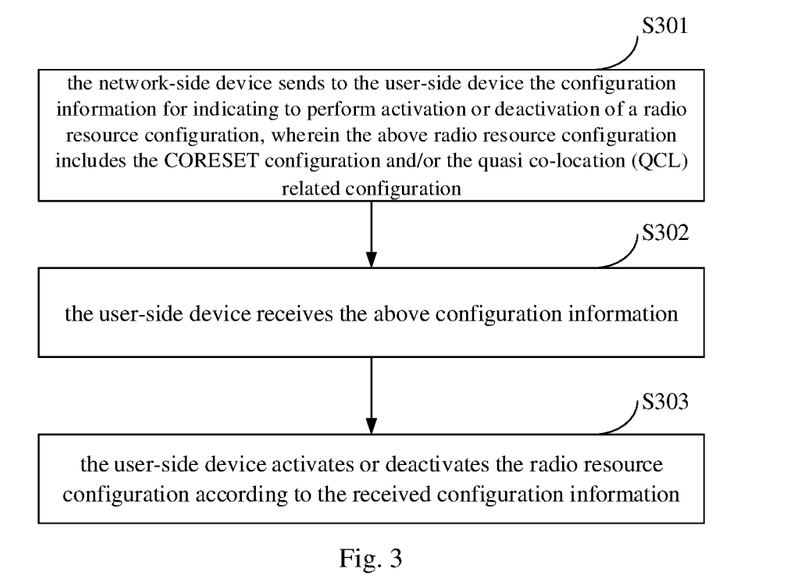
FIG. 3 is an interaction flowchart of a radio resource configuration method in an embodiment of the present application.

FIG. 3 is an interaction flowchart of a radio resource configuration method in an embodiment of the present application, that is, a flow chart of interactions between a network-side device and a user-side device when the radio resource configuration method is implemented. FIG. 3 includes the following steps:

Step S301, the network-side device sends to the user-side device the configuration information for indicating to perform activation or deactivation of a radio resource configuration; wherein the above radio resource configuration includes a CORESET configuration and/or a quasi co-location (QCL) related configuration;

Step S302, the user-side device receives the above configuration information;

Step S303, the user-side device activates or deactivates the radio resource configuration according to the received configuration information.

In the embodiment of the present application, the network-side device sends the configuration information to the user-side device so that the user-side device performs an operation of activating or deactivating the radio resource configuration according to the configuration information, thereby achieving a rapid activation or deactivation of the radio resource configuration. Moreover, the user-side device returns to the network-side device the time at which it receives the configuration information so that the network-side device can determine the time at which the user-side device performs the activation or deactivation operation, which ensures that the times known by the network-side device and the user-side device, at which the activation or deactivation operation on the user-side device is performed, are consistent, and thus the utilization efficiency of air interface resources is improved.

Therefore, the beneficial effects of the embodiment of the present application include at least: achieving the rapid activation or deactivation of the radio resource configuration; ensuring that the times known by the network-side device and the user-side device, at which the activation or deactivation operation on the user-side device is performed, are consistent; and improving the utilization efficiency of air interface resources.

The specific embodiments of the present specification have been described above. Other embodiments are within the scope of the appended claims. In some cases, the actions or steps recited in the claims may be performed in a different order than in the embodiments and the desired results may still be achieved. In addition, the processes depicted in the figures do not necessarily require the particular order shown or sequential order to achieve the desired results. In some embodiments, multitasking and parallel processing are also possible or may be advantageous.

Figure 4:
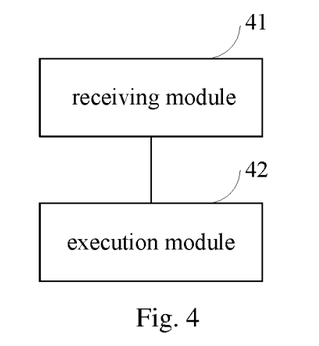
FIG. 4 is a structural diagram of a user-side device in an embodiment of the present application.

FIG. 4 is a structural diagram of a user-side device according to an embodiment of the present application, the user-side device being used to perform the above method as shown in FIG. 1. Referring to FIG. 4, the user-side device may include a receiving module 41 and an execution module 42, wherein, the receiving module 41 is configured to receive configuration information for indicating to perform activation or deactivation of a radio resource configuration; wherein the radio resource configuration includes a CORESET configuration and/or a quasi co-location (QCL) related configuration;

the execution module 42 is configured to activate or deactivate the radio resource configuration according to the above configuration information.

Optionally, the CORESET configuration is a configuration related to a signal parameter in a downlink control channel; the signal parameter includes at least one of: time, frequency, signal coding or signal space for signal receiving.

Optionally, the above CORESET includes at least one of: a frequency point of a control channel, a bandwidth of a frequency band of the control channel, a type of subcarrier spacing of the frequency band, a coding mode of the control channel, a beam identification, or a reference signal configuration.

Optionally, the above configuration information includes:
an identification of the radio resource configuration, an activation or deactivation bit;
the above execution module 42 is configured to:
perform activation of the radio resource configuration corresponding to the identification according to the activation bit; or
perform deactivation of the radio resource configuration corresponding to the identification according to the deactivation bit.

Optionally, the above configuration information includes: a third time interval and/or a fourth time interval;
the above execution module 42 is configured to:
perform an operation of activating a corresponding radio resource configuration after the third time interval from reception of the configuration information; and/or
perform an operation of deactivating the corresponding radio resource configuration after the fourth time interval from reception of the configuration information.

Optionally, the above configuration information includes: a first timer and/or a second timer;
the above execution module 42 is configured to:
initiate the first timer after deactivating a corresponding radio resource configuration or receiving the configuration information for indicating to perform deactivation of the corresponding radio resource configuration; activate the above radio resource configuration when the first timer expires; and/or
initiate the above second timer after activating the corresponding radio resource configuration or receiving the configuration information for indicating to perform activation of the corresponding radio resource configuration; deactivate the radio resource configuration when the second timer expires.

Optionally, the above execution module 42 is further configured to:
perform an operation of activating a corresponding radio resource configuration after a predetermined first time interval from reception of the configuration information; or
perform an operation of deactivating the corresponding radio resource configuration after a predetermined second time interval from reception of the configuration information.

Optionally, the above execution module 42 is further configured to:
initiate a predetermined third timer after deactivating a corresponding radio resource configuration or receiving the configuration information for indicating to perform deactivation of the corresponding radio resource configuration; activate the corresponding radio resource configuration when the third timer expires; or initiate a predetermined fourth timer after activating the corresponding radio resource configuration or receiving the configuration information for indicating to perform activation of the corresponding radio resource configuration; deactivate the corresponding radio resource configuration when the fourth timer expires.

Optionally, the configuration information is received through at least one of the following protocols:
a physical layer protocol, a media access control layer protocol, a radio link control layer protocol, a packet data convergence protocol, a service data adaptation protocol, and a radio resource control protocol.

The advantageous effects of the embodiment of the present application include at least: achieving the rapid activation or deactivation of the radio resource configuration; ensuring that the times known by the network-side device and the user-side device, at which the activation or deactivation operation on the user-side device is performed, are consistent; and improving the utilization efficiency of air interface resources.

The user-side device provided by the embodiment of the present disclosure can implement the processes implemented by the user-side device described in the method embodiment in FIG. 1. To avoid repetition, details are not described here again.

Figure 5:
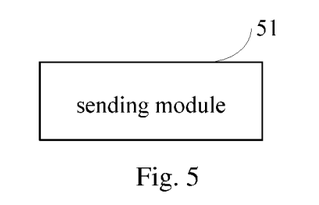
FIG. 5 is a structural diagram of a network-side device in an embodiment of the present application.

FIG. 5 is a structural diagram of a network-side device according to an embodiment of the present application, the network-side device being used to perform the method as shown in FIG. 2. Referring to FIG. 5, the network-side device may include:
a sending module 51, which is configured to send configuration information for indicating to perform activation or deactivation of a radio resource configuration; wherein the above radio resource configuration includes a CORESET configuration and/or a quasi co-location (QCL) related configuration.

Optionally, the CORESET configuration is a configuration related to a signal parameter in a downlink control channel; the signal parameter includes at least one of: time, frequency, signal coding or signal space for signal receiving.

Optionally, the CORESET configuration includes at least one of: a frequency point of a control channel, a bandwidth of a frequency band of the control channel, a type of subcarrier spacing of the frequency band, a coding mode of the control channel, a beam identification, or a reference signal configuration.

Optionally, the above configuration information includes:
an identification of the radio resource configuration, which is used to indicate the radio resource configuration to be activated or deactivated;
an activation or deactivation bit, which is used to indicate performing an activation or deactivation operation.

Optionally, the above configuration information includes:
a third time interval which is used to indicate performing, after the third time interval from reception of the configuration information, an operation of activating a corresponding radio resource configuration; and/or
a fourth time interval which is used to indicate performing, after the fourth time interval from reception of the configuration information, an operation of deactivating the corresponding radio resource configuration.

Optionally, the above configuration information includes:
a first timer which is used to indicate initiating the first timer after deactivating a corresponding radio resource configuration or receiving the configuration information for indicating to perform deactivation of the corresponding radio resource configuration, so as to activate the radio resource configuration when the first timer expires; and/or a second timer which is used to indicate initiating the second timer after activating the corresponding radio resource configuration or receiving the configuration information for indicating to perform activation of the corresponding radio resource configuration, so as to deactivate the radio resource configuration when the second timer expires.

Optionally, the configuration information is sent through at least one of the following protocols:

a physical layer protocol, a media access control layer protocol, a radio link control layer protocol, a packet data convergence protocol, a service data adaptation protocol, and a radio resource control protocol.

The advantageous effects of the embodiment of the present application include at least: achieving the rapid activation or deactivation of the radio resource configuration; ensuring that the times known by the network-side device and the user-side device, at which the activation or deactivation operation on the user-side device is performed, are consistent; and improving the utilization efficiency of air interface resources.

Figure 6:
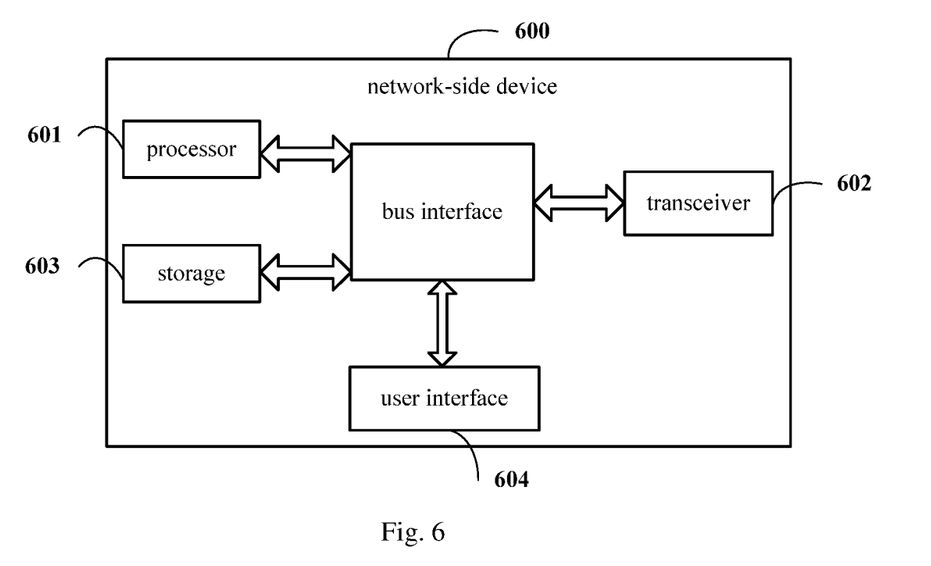
FIG. 6 is a structural diagram of a network-side device in yet another embodiment of the present application.

Referring to FIG. 6, it shows a structural diagram of a network-side device to which an embodiment of the present disclosure is applied and which can implement the details of the radio resource configuration method performed by the network-side device in the above embodiment and achieve the same effects. As shown in FIG. 6, the network-side device 600 includes a processor 601, a transceiver 602, a storage 603, a user interface 604 and a bus interface, wherein:

in the embodiment of the present disclosure, the network-side device 600 further includes: the storage 603, the processor 601, and a radio resource configuration program stored on the storage 603 and capable of running on the processor 601. When executed by the processor 601, the radio resource configuration program implements the following steps:

sending configuration information for indicating to perform activation or deactivation of a radio resource configuration; wherein the radio resource configuration includes a CORESET configuration and/or a quasi co-location (QCL) related configuration.

In FIG. 6, the bus architecture may include arbitrary number of interconnected buses and bridges, which link various circuits together such as one or more processors represented by the processor 601 and storages represented by the storage 603. The bus architecture can also link various other circuits such as the peripherals, the voltage regulator, and the power management circuit, which are well known in the art, and thus are not described further herein. The bus interface provides an interface. The transceiver 602 may be multiple elements, including a transmitter and a receiver, providing a unit for communicating with various other devices over a transmission medium. For different user equipment, the user interface 604 may also be an interface capable of connecting required devices externally or internally, and the connected devices include, but are not limited to, a keypad, a display, a speaker, a microphone, a joystick, and the like.

The processor 601 is responsible for managing the bus architecture and general processing, and the memory 603 may store data used by the processor 601 when performing operations.

Optionally, when the radio resource configuration program is executed by the processor 603, the CORESET configuration is a configuration related to a signal parameter in a downlink control channel; the signal parameter includes at least one of: time, frequency, signal coding or signal space for signal receiving.

Optionally, when the radio resource configuration program is executed by the processor 603, the CORESET configuration includes at least one of: a frequency point of a control channel, a bandwidth of a frequency band of the control channel, a type of subcarrier spacing of the frequency band, a coding mode of the control channel, a beam identification, or a reference signal configuration.

Optionally, when the radio resource configuration program is executed by the processor 603, the configuration information includes:

an identification of the radio resource configuration, which is used to indicate the radio resource configuration to be activated or deactivated;

an activation or deactivation bit, which is used to indicate performing an activation or deactivation operation.

Optionally, when the radio resource configuration program is executed by the processor 603, the configuration information includes:

a third time interval which is used to indicate performing, after the third time interval from reception of the configuration information, an operation of activating a corresponding radio resource configuration; and/or a fourth time interval which is used to indicate performing, after the fourth time interval from reception of the configuration information, an operation of deactivating the corresponding radio resource configuration.

Optionally, when the radio resource configuration program is executed by the processor 603, the configuration information includes:

a first timer which is used to indicate initiating the first timer after deactivating a corresponding radio resource configuration or receiving the configuration information for indicating to perform deactivation of the corresponding radio resource configuration, so as to activate the radio resource configuration when the first timer expires; and/or a second timer which is used to indicate initiating the second timer after activating the corresponding radio resource configuration or receiving the configuration information for indicating to perform activation of the corresponding radio resource configuration, so as to deactivate the radio resource configuration when the second timer expires.

Optionally, when the radio resource configuration program is executed by the processor 603, the configuration information is used to indicate performing an operation of activating a corresponding radio resource configuration after a predetermined third time interval from reception of the configuration information; and/or, to indicate performing an operation of deactivating the corresponding radio resource configuration after a predetermined fourth time interval from reception of the configuration information.

Optionally, when the radio resource configuration program is executed by the processor 603, the configuration information is used to indicate initiating a predetermined third timer after deactivating a corresponding radio resource configuration or receiving the configuration information for indicating to perform deactivation of the corresponding radio resource configuration, so as to activate the corresponding radio resource configuration when the third timer expires;

and/or to indicate initiating a predetermined fourth timer after activating the corresponding radio resource configuration or receiving the configuration information for indicating to perform activation of the corresponding radio resource configuration, so as to deactivate the corresponding radio resource configuration when the fourth timer expires.

Optionally, when the radio resource configuration program is executed by the processor 603, the sending the configuration information including:

the configuration information is sent through at least one of the following protocols:

a physical layer protocol, a media access control layer protocol, a radio link control layer protocol, a packet data convergence protocol, a service data adaptation protocol, and a radio resource control protocol.

The advantageous effects of the embodiment of the present application include at least: achieving the rapid activation or deactivation of the radio resource configuration; ensuring that the times known by the network-side device and the user-side device, at which the activation or deactivation operation on the user-side device is performed, are consistent; and improving the utilization efficiency of air interface resources.

Figure 7:
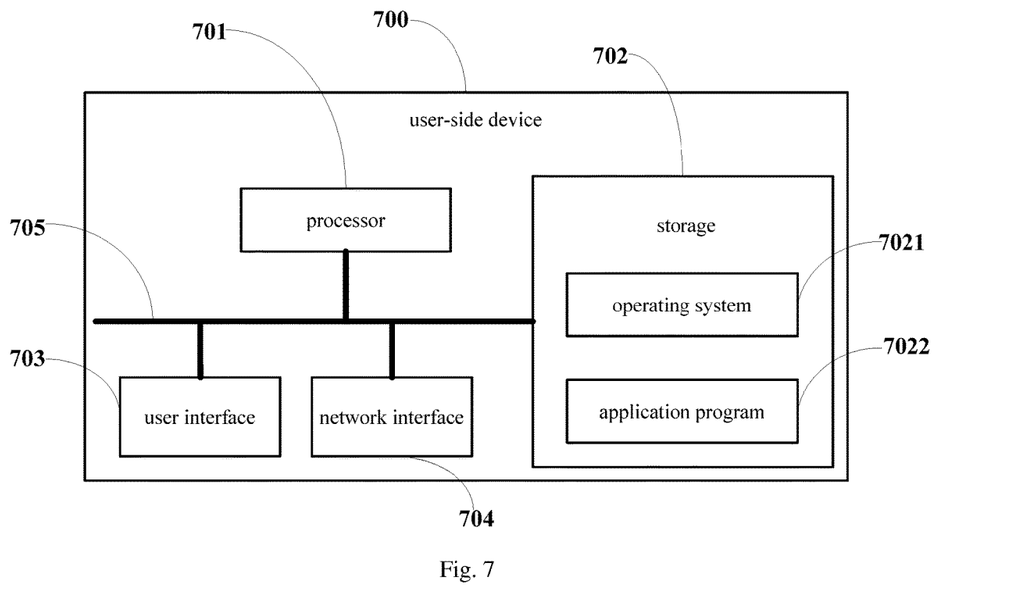
FIG. 7 is a structural diagram of a user-side device in yet another embodiment of the present application.

FIG. 7 is a block diagram of a user-side device according to another embodiment of the present disclosure. The user-side device 700 shown in FIG. 7 includes: at least one processor 701, a storage 702, at least one network interface 704, and a user interface 703. Various components in the terminal equipment 700 are coupled with each other through the a bus system 705. It will be appreciated that the bus system 705 is configured to implement connection and communication between these components. In addition to a data bus, the bus system 705 includes a power bus, a control bus, and a status signal bus. However, for the sake of clarity, various buses are marked as the bus system 705 in FIG. 7.

Wherein, the user interface 703 may include a display, a keyboard or a pointing device (e.g., a mouse, a trackball, a touch pad, or a touch screen, etc.).

It will be appreciated that, the storage 702 in the embodiment of the present disclosure may be a volatile memory or a non-volatile memory, or may include both volatile and non-volatile memory. Among them, the non-volatile memory may be a read-only memory (ROM), a programmable ROM (PROM), an erasable PROM (EPROM), an electronically EPROM (EEPROM) or a flash memory. The volatile memory may be a Random Access Memory (RAM), which is used as an external cache. By way of example, but not limitation, many forms of RAM are available, such as a static RAM (SRAM), a dynamic RAM (DRAM), a synchronous DRAM (SDRAM), a double data rate SDRAM (DDRSDRAM), an enhanced SDRAM (ESDRAM), a Synchlink DRAM (SLDRAM), and a DirectRambus RAM (DRRAM). The storage 702 of the systems and methods described in the embodiments of the present disclosure is intended to include, but is not limited to, these and any other suitable types of memory.

In some implementations, the storage 702 stores the following elements, executable modules, or data structures, or a subset of them, or their extended set: an operating system 7021 and an application program 7022.

Wherein the operating system 7021 includes various system programs, such as a framework layer, a core library layer, a driver layer, etc., and is used to implement various basic services and to process hardware-based tasks. The application program 7022 includes various application programs, such as a media player, a browser, etc., and is used to implement various application services. A program for implementing the method of an embodiment of the present disclosure may be included in the application program 7022.

In the embodiment of the present disclosure, the terminal equipment 700 further includes: a storage 709, a processor 701, and a radio resource configuration program stored on the storage 709 and capable of running on the processor 701. The radio resource configuration program implements, when executed by the processor 701, the following steps:

receiving configuration information for indicating to perform activation or deactivation of a radio resource configuration; wherein the radio resource configuration comprises a CORESET configuration and/or a quasi co-location (QCL) related configuration;

activating or deactivating the radio resource configuration according to the above configuration information.

The above method disclosed by the embodiment of the present disclosure may be applied to or implemented by the processor 701. The processor 701 may be an integrated circuit chip with a signal processing capability. In the implementation, the steps of the above method may be completed by using hardware integrated logic circuits or instructions in the form of software in the processor 701. The processor 701 may be a general-purpose processor, a digital signal processor (DSP), an application specific integrated circuit (ASIC), a field programmable gate array (FPGA), or other programmable logic devices, discrete gate or transistor logic devices, discrete hardware components. The methods, steps, and logical block diagrams disclosed in the embodiments of the present invention may be implemented or executed. A general-purpose processor may be a microprocessor or the processor may be any conventional processor or the like. The steps of the methods disclosed in combination with the embodiments of the present invention may be directly implemented by a hardware decoding processor, or may be performed by using a combination of hardware and software modules in the decoding processor. The software modules may be located in a computer-readable storage medium well-known in the art, such as a random access memory, a flash memory, a read-only memory, a programmable read-only memory, or an electrically erasable programmable memory, a register, and the like. The computer-readable storage medium is located in the storage 702, and the processor 701 reads the information in the storage 702 and completes the steps of the above methods in combination with its hardware. Specifically, a radio resource configuration program is stored on the computer-readable storage medium. When the radio resource configuration program is executed by the processor 701, the steps of the radio resource configuration method embodiments described above are implemented.

It will be appreciated that the embodiments described in the embodiments of the present disclosure may be implemented by hardware, software, firmware, middleware, microcode, or a combination thereof. For hardware implementation, the processing unit can be implemented in one or more application specific integrated circuits (ASICs), digital signal processors (DSPs), digital signal processing devices (DSPDs), programmable logic devices (PLDs), field-programmable gate arrays (FPGA)s, general-purpose processors, controllers, microcontrollers, microprocessors, and other electronic units for performing the functions described in this application or a combination thereof.

For software implementation, the technology described in the embodiments of the present disclosure may be implemented by modules (such as processes, functions, etc.) that perform the functions described in the embodiments of the present disclosure. Software codes may be stored in a storage and executed by a processor. The storage may be implemented in the processor or external to the processor.

Optionally, when the computer program is executed by the processor 701, the CORESET configuration is a configuration related to a signal parameter in a downlink control channel; the signal parameter includes at least one of: time, frequency, signal coding or signal space for signal receiving.

Optionally, when the computer program is executed by the processor 701, the CORESET configuration includes at least one of: a frequency point of a control channel, a bandwidth of a frequency band of the control channel, a type of subcarrier spacing of the frequency band, a coding mode of the control channel, a beam identification, or a reference signal configuration.

Optionally, when the computer program is executed by the processor 701, the above configuration information includes:

an identification of the radio resource configuration, an activation or deactivation bit;

the activating or deactivating the radio resource configuration according to the configuration information includes:

performing activation of the radio resource configuration corresponding to the identification according to the activation bit;

or, performing deactivation of the radio resource configuration corresponding to the identification according to the deactivation bit.

Optionally, when the computer program is executed by the processor 701, the above configuration information includes: a third time interval and/or a fourth time interval;

the activating or deactivating the radio resource configuration according to the configuration information includes:

performing an operation of activating a corresponding radio resource configuration after the third time interval from reception of the configuration information; and/or performing an operation of deactivating the corresponding radio resource configuration after the fourth time interval from reception of the configuration information.

Optionally, when the computer program is executed by the processor 701, the above configuration information includes: a first timer and/or a second timer;

the activating or deactivating the radio resource configuration according to the configuration information includes:

initiating the first timer after deactivating a corresponding radio resource configuration or receiving the configuration information for indicating to perform deactivation of the corresponding radio resource configuration; activating the radio resource configuration when the first timer expires; and/or initiating the second timer after activating the corresponding radio resource configuration or receiving the configuration information for indicating to perform activation of the corresponding radio resource configuration; deactivating the radio resource configuration when the second timer expires.

Optionally, when the computer program is executed by the processor 701, the activating or deactivating the radio resource configuration according to the configuration information includes:

performing an operation of activating a corresponding radio resource configuration after a predetermined first time interval from reception of the configuration information; and/or performing an operation of deactivating the corresponding radio resource configuration after a predetermined second time interval from reception of the configuration information.

Optionally, when the computer program is executed by the processor 701, the activating or deactivating the radio resource configuration according to the configuration information includes:

initiating a predetermined third timer after deactivating a corresponding radio resource configuration or receiving the configuration information for indicating to perform deactivation of the corresponding radio resource configuration; activating the corresponding radio resource configuration when the third timer expires; and/or initiating a predetermined fourth timer after activating the corresponding radio resource configuration or receiving the configuration information for indicating to perform activation of the corresponding radio resource configuration; deactivating the corresponding radio resource configuration when the fourth timer expires.

Optionally, when the computer program is executed by the processor 701, the configuration information is received through at least one of the following protocols:

a physical layer protocol, a media access control layer protocol, a radio link control layer protocol, a packet data convergence protocol, a service data adaptation protocol, and a radio resource control protocol.

The user-side device 700 can implement the processes implemented by the terminal equipment in the above embodiment. To avoid repetition, details are not described here again.

The advantageous effects of the embodiment of the present application include at least: achieving the rapid activation or deactivation of the radio resource configuration; ensuring that the times known by the network-side device and the user-side device, at which the activation or deactivation operation on the user-side device is performed, are consistent; and improving the utilization efficiency of air interface resources.

An embodiment of the present application further provides a computer readable storage medium on which a radio resource configuration program is stored. When executed by a processor, the radio resource configuration program implements the steps of the radio resource configuration method as shown in FIG. 1; or, when executed by a processor, the radio resource configuration program implements the steps of the radio resource configuration method as shown in FIG. 2.

Those skilled in the art will be appreciated that some embodiments of the present disclosure may be provided as a method, a device, or a computer program product. Therefore, some embodiments of the present disclosure may take the form of an entirely hardware embodiment, an entirely software embodiment, or an embodiment combining software and hardware. Moreover, some embodiments of the present disclosure may employ computer program products implemented on one or more computer-usable storage media (including but not limited to disk storage, CD-ROM, optical storage, etc.) containing computer-usable program codes.

The present disclosure is described with reference to flowcharts and/or block diagrams of methods, devices (systems), and computer program products according to the embodiments of the present disclosure. It will be appreciated that each process and/or block in the flowcharts and/or block diagrams, and combinations of processes and blocks in the flowcharts and block diagrams may be implemented by computer program instructions. These computer program instructions may be provided to a processor of a general purpose computer, special purpose computer, embedded processor, or other programmable data processing device to produce a machine, such that the instructions executed by the processor of the computer or other programmable data processing device generate means for implementing the functions specified in one or more of the processes in the flowcharts and/or one or more of the blocks in the block diagrams.

These computer program instructions may also be stored in a computer-readable storage capable of directing a computer or other programmable data processing device to work in a specific manner, such that the instructions stored in the computer-readable storage produce a manufactured article including the instruction means which implements the functions specified in one or more of the processes in the flowcharts and/or one or more of the blocks in the block diagrams.

These computer program instructions may also be loaded on a computer or other programmable data processing devices, so that a series of operation steps can be performed on the computer or other programmable devices to produce a computer-implemented process, so that the instructions executed on the computer or other programmable device provide the steps for implementing the functions specified in one or more of the processes in the flowcharts and/or one or more of the blocks in the block diagrams.

In a typical configuration, a computing device includes one or more processors (CPUs), input/output interfaces, network interfaces, and memories.

The memory may include non-persistent memory, random access memory (RAM), and/or non-volatile memory in computer-readable medium, such as read-only memory (ROM) or flash RAM. The memory is an example of a computer-readable medium.

The computer-readable medium includes both permanent and non-persistent, removable and non-removable media, which can implement information storage by any method or technology. Information may be computer-readable instructions, data structures, modules of programs, or other data. Examples of a computer storage medium includes, but are not limited to, a phase change memory (PRAM), a static random access memory (SRAM), a dynamic random access memory (DRAM), other types of random access memory (RAM), a read-only memory (ROM), a electrically erasable programmable read-only memory (EEPROM), a flash memory or other memory technologies, a read-only disc read-only memory (CD-ROM), a digital versatile disc (DVD) or other optical storages, a magnetic tape cartridges, a magnetic tape, a magnetic disk storage or other magnetic storage devices or any other non-transmission media, which may be used to store information that can be accessed by computing devices. As defined herein, a computer-readable medium does not include computer-readable temporary media, such as modulated data signals and carrier waves.

It should also be noted that, the terms "including", "comprising", or any other variation thereof are intended to encompass non-exclusive inclusion, such that a process, method, article, or device that includes a series of elements includes not only those elements but also those that are not explicitly listed, or also includes elements that are inherent to the process, method, article or device. Without more restrictions, the elements defined by the sentence "comprising a . . . " do not exclude the existence of other identical elements in the process, method, article, or device comprising said elements.

Those skilled in the art will be appreciated that the embodiments of the present application may be provided as a method, a device, or a computer program product. Therefore, the present application may take the form of an entirely hardware embodiment, an entirely software embodiment, or an embodiment combining software and hardware. Moreover, the present application may employ computer program products implemented on one or more computer-usable storage media (including but not limited to disk storage, CD-ROM, optical storage, etc.) containing computer-usable program codes.

The above are merely the embodiments of the present application, and are not intended to limit the present application. For those of ordinary skill in the art, various modifications and changes may be made to the present application. Any modifications, equivalent replacements, and improvements made within the spirit and principle of this application shall be fallen into the scope of claims of this application.

What is claimed is:

1. A radio resource configuration method, comprising:
receiving configuration information for indicating to perform activation or deactivation of a radio resource configuration; wherein the radio resource configuration comprises a control resource set (CORESET) configuration and/or a quasi co-location (QCL) related configuration, and the configuration information is sent through a physical address (MAC) control signaling;
activating or deactivating the radio resource configuration according to the configuration information,
wherein, the activating or deactivating the radio resource configuration according to the configuration information comprises:
performing an operation of activating a corresponding radio resource configuration after a predetermined first time interval from reception of the configuration information; or
performing an operation of deactivating the corresponding radio resource configuration after a predetermined second time interval from reception of the configuration information;
wherein the configuration information comprises:
an identification of the radio resource configuration, an activation or deactivation bit;
the activating or deactivating the radio resource configuration according to the configuration information comprises:
performing activation of the radio resource configuration corresponding to the identification according to the activation bit;
or, performing deactivation of the radio resource configuration corresponding to the identification according to the deactivation bit.

2. The method according to claim 1, wherein the CORESET configuration is a configuration related to a signal parameter in a downlink control channel; the signal parameter comprises at least one of: time, frequency, signal coding or signal space for signal receiving.

3. The method according to claim 1, wherein the CORESET configuration comprises at least one of: a frequency point of a control channel, a bandwidth of a frequency band of the control channel, a type of subcarrier spacing of the frequency band, a coding mode of the control channel, a beam identification, or a reference signal configuration.

4. The method according to claim 1, wherein the configuration information further comprises: a third time interval and/or a fourth time interval;
the activating or deactivating the radio resource configuration according to the configuration information comprises:

performing an operation of activating a corresponding radio resource configuration after the third time interval from reception of the configuration information; and/or performing an operation of deactivating the corresponding radio resource configuration after the fourth time interval from reception of the configuration information.

5. The method according to claim 1, wherein the configuration information comprises: a first timer and/or a second timer;

the activating or deactivating the radio resource configuration according to the configuration information comprises:

initiating the first timer after deactivating a corresponding radio resource configuration or receiving the configuration information for indicating to perform deactivation of the corresponding radio resource configuration; activating the radio resource configuration when the first timer expires; and/or initiating the second timer after activating the corresponding radio resource configuration or receiving the configuration information for indicating to perform activation of the corresponding radio resource configuration; deactivating the radio resource configuration when the second timer expires.

6. The method according to claim 1, wherein, the activating or deactivating the radio resource configuration according to the configuration information comprises:

initiating a predetermined third timer after deactivating a corresponding radio resource configuration or receiving the configuration information for indicating to perform deactivation of the corresponding radio resource configuration; activating the corresponding radio resource configuration when the third timer expires; or initiating a predetermined fourth timer after activating the corresponding radio resource configuration or receiving the configuration information for indicating to perform activation of the corresponding radio resource configuration; deactivating the corresponding radio resource configuration when the fourth timer expires.

7. The method according to claim 1, wherein, receiving the configuration information through at least one of the following protocols:

a physical layer protocol, a media access control layer protocol, a radio link control layer protocol, a packet data convergence protocol, a service data adaptation protocol, and a radio resource control protocol.

8. A non-transitory computer readable storage medium storing a radio resource configuration program thereon, the radio resource configuration program implements, when executed by a processor, the steps of the radio resource configuration method according to claim 1.

9. A radio resource configuration method, comprising:

sending configuration information for indicating to perform activation or deactivation of a radio resource configuration; wherein the radio resource configuration comprises a CORESET configuration and/or a quasi co-location (QCL) related configuration, and the configuration information is sent through a physical address (MAC) control signaling, wherein activation or deactivation of the radio resource configuration is performed according to the configuration information, in which an operation of activating a corresponding radio resource configuration is performed after a predetermined first time interval from reception of the configuration information, or an operation of deactivating the corresponding radio resource configuration is performed after a predetermined second time interval from reception of the configuration information;

wherein the configuration information comprises:

an identification of the radio resource configuration, an activation or deactivation bit;

wherein the activation of the radio resource configuration corresponding to the identification is performed according to the activation bit;

or, the deactivation of the radio resource configuration corresponding to the identification is performed according to the deactivation bit.

10. The method according to claim 9, wherein the CORESET configuration is a configuration related to a signal parameter in a downlink control channel; the signal parameter comprises at least one of: time, frequency, signal coding or signal space for signal receiving.

11. The method according to claim 9, wherein the CORESET configuration comprises at least one of: a frequency point of a control channel, a bandwidth of a frequency band of the control channel, a type of subcarrier spacing of the frequency band, a coding mode of the control channel, a beam identification, or a reference signal configuration.

12. The method according to claim 9, wherein the configuration information comprises:

an identification of the radio resource configuration, which is used to indicate the radio resource configuration to be activated or deactivated;

an activation or deactivation bit, which is used to indicate performing an activation or deactivation operation.

13. The method according to claim 9, wherein the configuration information comprises:

a third time interval which is used to indicate performing, after the third time interval from reception of the configuration information, an operation of activating a corresponding radio resource configuration; and/or a fourth time interval which is used to indicate performing, after the fourth time interval from reception of the configuration information, an operation of deactivating the corresponding radio resource configuration.

14. The method according to claim 9, wherein the configuration information comprises:

a first timer which is used to indicate initiating the first timer after deactivating a corresponding radio resource configuration or receiving the configuration information for indicating to perform deactivation of the corresponding radio resource configuration, so as to activate the radio resource configuration when the first timer expires; and/or a second timer which is used to indicate initiating the second timer after activating the corresponding radio resource configuration or receiving the configuration information for indicating to perform activation of the corresponding radio resource configuration, so as to deactivate the radio resource configuration when the second timer expires.

15. The method according to claim 9, wherein, sending the configuration information through at least one of the following protocols:

a physical layer protocol, a media access control layer protocol, a radio link control layer protocol, a packet data convergence protocol, a service data adaptation protocol, and a radio resource control protocol.

16. A non-transitory computer readable storage medium storing a radio resource configuration program thereon, the radio resource configuration program implements, when executed by a processor, the steps of the radio resource configuration method according to claim 9.

17. A user-side device, comprising:
a storage, a processor, and a radio resource configuration program stored on the storage and capable of running on the processor, the radio resource configuration program implements, when executed by the processor, the following steps of a radio resource configuration method;
receiving configuration information for indicating to perform activation or deactivation of a radio resource configuration; wherein the radio resource configuration comprises a control resource set (CORESET) configuration and/or a quasi co-location (QCL) related configuration, and the configuration information is sent through a physical address (MAC) control signaling;
activating or deactivating the radio resource configuration according to the configuration information,
wherein, the activating or deactivating the radio resource configuration according to the configuration information comprises:
performing an operation of activating a corresponding radio resource configuration after a predetermined first time interval from reception of the configuration information; or
performing an operation of deactivating the corresponding radio resource configuration after a predetermined second time interval from reception of the configuration information;
wherein the configuration information comprises:
an identification of the radio resource configuration, an activation or deactivation bit;
the activating or deactivating the radio resource configuration according to the configuration information comprises:
performing activation of the radio resource configuration corresponding to the identification according to the activation bit;
or, performing deactivation of the radio resource configuration corresponding to the identification according to the deactivation bit.

18. A network-side device, comprising:
a storage, a processor, and a radio resource configuration program stored on the storage and capable of running on the processor, the radio resource configuration program implements, when executed by the processor, the steps of the radio resource configuration method according to claim 9.

* * * * *